United States Patent
Whittemore

(10) Patent No.: US 10,538,930 B2
(45) Date of Patent: Jan. 21, 2020

(54) POLE CLAMP SYSTEM FOR PARTITION MOUNT

(71) Applicant: Zipwall, LLC, Arlington, MA (US)

(72) Inventor: Jeffrey P. Whittemore, Arlington, MA (US)

(73) Assignee: Zipwall, LLC, Arlington, MA (US)

( * ) Notice: Subject to any disclaimer, the term of this patent is extended or adjusted under 35 U.S.C. 154(b) by 0 days.

(21) Appl. No.: 16/217,649

(22) Filed: Dec. 12, 2018

(65) Prior Publication Data

US 2019/0186162 A1  Jun. 20, 2019

Related U.S. Application Data

(63) Continuation of application No. 15/203,942, filed on Jul. 7, 2016, now Pat. No. 10,174,514.

(60) Provisional application No. 62/189,889, filed on Jul. 8, 2015.

(51) Int. Cl.
  *F16M 13/02* (2006.01)
  *E04G 25/08* (2006.01)
  *F16B 2/04* (2006.01)
  *E04G 21/24* (2006.01)

(52) U.S. Cl.
  CPC .......... *E04G 25/08* (2013.01); *E04G 21/243* (2013.01); *F16B 2/04* (2013.01)

(58) Field of Classification Search
  CPC ...... F16M 13/02; F16M 13/022; F16M 11/10; F16M 11/041; F16M 11/28; F16M 13/00
  USPC ............ 248/534, 538, 539, 540, 541, 230.1, 248/230.7, 230.8, 121, 122.1
  See application file for complete search history.

(56) References Cited

U.S. PATENT DOCUMENTS

| | | |
|---|---|---|
| 827,000 A | 7/1906 | Dinsmore |
| 1,766,324 A | 6/1930 | Berner |
| 2,219,169 A | 10/1940 | Alter |
| 2,232,194 A | 2/1941 | Zogby |
| 2,474,158 A | 9/1944 | Neely |
| 2,487,585 A | 11/1949 | Pencek |
| 2,816,769 A | 12/1957 | Noble |
| 2,903,227 A | 9/1959 | de Kalb Key |

(Continued)

FOREIGN PATENT DOCUMENTS

| | | |
|---|---|---|
| DE | 3918516 | 6/1989 |
| DE | 29605222 | 7/1996 |

(Continued)

OTHER PUBLICATIONS

"Pole Clamp System for Partition Mount" Specification, Drawings and Prosecution History of U.S. Appl. No. 15/203,942, filed Jul. 7, 2016, now U.S. Pat. No. 10,174,514, dated Jan. 8, 2019 by Jeffrey P. Whittemore.

(Continued)

*Primary Examiner* — Steven M Marsh
(74) *Attorney, Agent, or Firm* — Onello & Mello LLP

(57) ABSTRACT

A pole clamp system for mounting between a pole and an abutting surface includes a pole interface configured to interface with a side body portion of a pole, a guide portion extending from the pole interface, a locking plate extending from the pole interface adjacent to the guide portion, a biasing unit extending through the guide portion and the locking plate, and a head interface coupled to the biasing unit. The biasing unit outwardly biases the pole interface and head interface in opposite directions.

18 Claims, 16 Drawing Sheets

(56) References Cited

U.S. PATENT DOCUMENTS

| | | |
|---|---|---|
| 2,942,829 A | 6/1960 | Stiffel |
| 3,072,784 A | 1/1963 | Mann |
| 3,090,826 A | 5/1963 | Cochran |
| 3,118,363 A | 1/1964 | Burgess, Jr. |
| 3,247,558 A | 4/1966 | Kaufman |
| 3,322,381 A | 5/1967 | Bubb |
| 3,327,310 A | 6/1967 | Bethune et al. |
| 3,333,808 A | 8/1967 | Du Boff |
| 3,350,120 A | 10/1967 | Hinrichs |
| 3,529,860 A | 9/1970 | Jelley |
| 3,592,434 A | 7/1971 | Murray |
| 3,604,397 A | 9/1971 | Salerno |
| 3,608,991 A | 9/1971 | Wade |
| 3,713,643 A | 1/1973 | Gerstenberger |
| 3,767,253 A | 10/1973 | Kluetsch |
| 3,792,510 A | 2/1974 | Evett |
| 3,822,850 A | 7/1974 | Elias |
| 3,952,877 A | 4/1976 | Kindl |
| 3,956,784 A | 5/1976 | Vargas |
| 3,972,272 A | 8/1976 | Bagby |
| 4,078,756 A | 3/1978 | Cross |
| 4,087,006 A | 5/1978 | Schill |
| 4,111,217 A | 9/1978 | Victor |
| 4,139,101 A | 2/1979 | Towfigh |
| 4,277,863 A | 7/1981 | Faneuf |
| 4,379,654 A | 4/1983 | Rovelli |
| 4,396,325 A | 8/1983 | Joice-Cavanagh |
| 4,488,651 A | 12/1984 | Bishop |
| 4,502,256 A | 3/1985 | Hahn |
| 4,536,924 A | 8/1985 | Willoughby |
| 4,576,354 A | 3/1986 | Blessing, Sr. |
| 4,592,797 A | 6/1986 | Carlson |
| 4,645,473 A | 2/1987 | Mochizuki |
| 4,662,034 A | 5/1987 | Cunningham |
| 4,708,189 A | 11/1987 | Ward |
| 4,715,089 A | 12/1987 | Schema |
| 4,717,107 A | 1/1988 | Servadio |
| 4,770,086 A | 9/1988 | Gabster |
| 4,794,974 A | 1/1989 | Melino |
| 4,824,302 A | 4/1989 | Schultheis et al. |
| 4,874,028 A | 10/1989 | Lynch et al. |
| 4,885,876 A | 12/1989 | Henke |
| 4,907,835 A | 3/1990 | Salters |
| 4,912,814 A | 4/1990 | McKenzie |
| 4,969,241 A | 11/1990 | Griffin |
| 5,038,889 A | 8/1991 | Jankowski |
| 5,040,915 A | 8/1991 | Stuart et al. |
| 5,056,753 A | 10/1991 | Lunau et al. |
| 5,078,348 A | 1/1992 | Babitchenko |
| 5,116,012 A | 5/1992 | Offenhauer et al. |
| 5,129,774 A | 7/1992 | Balseiro et al. |
| 5,170,974 A | 12/1992 | Ruggiero |
| 5,287,614 A | 2/1994 | Ehrlich |
| 5,301,915 A | 4/1994 | Bahniuk et al. |
| 5,308,280 A | 5/1994 | Dotson |
| 5,345,989 A | 9/1994 | Brophy |
| 5,375,303 A | 12/1994 | Shenier |
| 5,379,491 A | 1/1995 | Solo |
| 5,384,938 A | 1/1995 | Frederick |
| 5,388,283 A | 2/1995 | Garnett |
| 5,404,602 A | 4/1995 | Kondo |
| 5,469,607 A | 11/1995 | Henningsson et al. |
| 5,497,537 A | 3/1996 | Robinson et al. |
| 5,524,693 A | 6/1996 | Hamilton |
| 5,529,326 A | 6/1996 | Hwang |
| 5,536,229 A | 7/1996 | Albergo |
| 5,542,209 A | 8/1996 | Sheu |
| 5,555,607 A | 9/1996 | Parveris |
| 5,558,501 A | 9/1996 | Wang et al. |
| 5,584,456 A | 12/1996 | Stephens |
| 5,649,780 A | 7/1997 | Schall |
| 5,666,702 A | 9/1997 | Ming-Chieh |
| 5,673,741 A | 10/1997 | Cairns |
| 5,707,032 A | 1/1998 | Ehrlich |
| 5,715,620 A | 2/1998 | Walker |
| 5,803,653 A | 9/1998 | Zuffetti |
| 5,832,652 A | 11/1998 | Bartys |
| 5,884,424 A | 3/1999 | Smith |
| 5,897,085 A | 4/1999 | Cronin |
| 5,918,843 A | 7/1999 | Stammers |
| 5,924,469 A | 7/1999 | Whittemore |
| 5,937,488 A | 8/1999 | Geiger |
| 5,940,942 A | 8/1999 | Fong |
| 5,941,434 A | 8/1999 | Green |
| 5,941,586 A | 8/1999 | Fann |
| 5,979,110 A | 11/1999 | Tai |
| 6,152,434 A | 11/2000 | Gluck |
| 6,164,605 A | 12/2000 | Drake et al. |
| 6,209,615 B1 | 4/2001 | Whittemore |
| 6,378,175 B1 | 4/2002 | Vanderpan |
| 6,467,741 B1 | 10/2002 | Shih |
| 6,508,295 B2 | 1/2003 | Whittemore |
| 6,523,231 B1 | 2/2003 | Lassiter |
| 6,808,151 B1 * | 10/2004 | McLaughlin ............ B60Q 1/24 248/354.1 |
| 7,073,758 B2 * | 7/2006 | Whittemore ............ E04G 21/30 24/338 |
| 7,533,712 B2 | 5/2009 | Whittemore |
| 7,658,219 B2 | 2/2010 | Whittemore |
| 7,717,382 B2 * | 5/2010 | Whittemore ............ B65H 49/26 156/577 |
| 7,743,512 B1 | 6/2010 | Whittemore |
| 7,980,580 B2 * | 7/2011 | Loewenthal ............ A61G 5/12 248/230.1 |
| 8,141,839 B2 | 3/2012 | Buchner |
| 8,371,360 B2 | 2/2013 | Whittemore |
| 8,857,499 B2 | 10/2014 | Whittemore |
| 2003/0154588 A1 | 8/2003 | Blacket et al. |
| 2004/0031892 A1 | 2/2004 | Whittemore et al. |
| 2004/0065799 A1 | 4/2004 | Whittemore |
| 2005/0247414 A1 | 11/2005 | Whittemore |
| 2007/0246633 A1 | 10/2007 | Carnevali |
| 2007/0257170 A1 | 11/2007 | Whittemore et al. |
| 2010/0252711 A1 * | 10/2010 | Buchner ............ E04H 12/2269 248/539 |

FOREIGN PATENT DOCUMENTS

| | | |
|---|---|---|
| FR | 2411282 | 6/1979 |
| GB | 10420086 | 9/1966 |
| WO | 8603538 | 6/1986 |
| WO | 9109556 | 7/1991 |
| WO | 2007030068 | 3/2007 |

OTHER PUBLICATIONS

ISRWO dated Sep. 9, 2016 issued in corresponding International Application No. PCT/US2016/041238.

* cited by examiner

POLE CLAMP SYSTEM FOR PARTITION MOUNT

RELATED APPLICATIONS

This application is a continuation of U.S. Provisional patent application Ser. No. 15/203,942, filed Jul. 7, 2016, which claims the benefit of U.S. Provisional Patent Application Ser. No. 62/189,889, filed Jul. 8, 2015, the content of each being incorporated herein by reference in its entirety.

This application is related to U.S. Pat. No. 5,924,469, issued on Jul. 20, 1999, U.S. Pat. No. 7,658,219, issued on Feb. 9, 2010, U.S. Pat. No. 7,073,758, issued on Jul. 11, 2006, U.S. Pat. No. 7,533,712, issued on May 19, 2009, and U.S. Pat. No. 7,743,512, issued on Jun. 29, 2010, the contents of each being incorporated herein by reference in their entirety. The pole clamp system of this application may be used in connection with any of the above patents.

BACKGROUND

Partition systems are often employed to isolate portions of a building or room, by serving as a barrier to dust, noise, light, odors, and the like. In construction zones, partitions are useful for protecting a clean area from a work area, for example, protecting an area where furniture and rugs are temporarily stored from an area where wood floors are being refinished.

Workers at construction sites often use rudimentary techniques for installing partitions. Some simply nail, screw, or staple the curtain or partition material to the floor, ceiling, and abutting walls, resulting in damage to their surfaces. Others tape, or otherwise adhere, a curtain or plastic sheet to the walls and ceilings. The tape usually fails to stick, but if it does stick, as the tape is removed, paint can pull off with the tape, or adhesive is left behind.

U.S. Pat. No. 5,924,469, the content of which is incorporated herein by reference, discloses a partition mount system that addresses these limitations. This system offers the advantage of accommodating standard extension poles, for example, painters poles, with standard threads, and is compatible with a variety of commercially-available curtain or drape materials, for example plastic, cloth, and the like. The disclosed system is a "clean" system designed to be installed and removed without damaging or otherwise marking the ceiling, floor or walls in the construction zone. Assembly is easy and fast and can be accomplished by a single individual. In certain applications however, a sag, or gap, may be present in the curtain along a mounting pole next to a wall, ceiling, door frame, or other abutting surface, compromising the effectiveness of the installation.

SUMMARY

Embodiments of the present inventive concepts provide a system that mitigates or eliminates sag, or gaps, between an installed curtain and an abutting surface such as a wall or ceiling. The system accomplishes this in a manner that avoids permanent damage to the wall or ceiling surface. A clamp is mounted between an erected pole and a nearby wall, window, or other surface. The clamp interfaces with a head that urges the installed curtain against the wall over the length of the head, using the pole and wall for leverage. In this manner, the effectiveness of the installation is increased, by reducing or eliminating gaps in the installed curtain along the wall. The clamp includes a hook portion, guide/handle portion, a locking mechanism and a biasing unit or compressible arm. A head is coupled to an end of the biasing unit.

According to an aspect of the present inventive concepts, a pole clamp system for mounting between a pole and an abutting surface includes a pole interface configured to interface with a side body portion of a pole, a guide portion extending from the pole interface, a locking plate extending from the pole interface adjacent to the guide portion, a biasing unit extending through the guide portion and the locking plate, and a head interface coupled to the biasing unit. The biasing unit outwardly biases the pole interface and head interface in opposite directions.

In some embodiments, the pole interface comprises a base portion and a hook extending in a first direction at an angle from the base portion.

In some embodiments, the base portion is offset from the biasing unit and extends in parallel to the biasing unit.

In some embodiments, the hook comprises two points of contact for interfacing with a pole.

In some embodiments, the guide portion and the locking plate extend from the base portion in a second direction opposite to the first direction.

In some embodiments, the biasing unit is linear.

In some embodiments, the biasing unit includes a pole segment having a first end and a second end, the pole segment being adjustable in length between the first end and the second end, the pole segment having a longitudinal axis, a rod that extends into second end of the pole segment and configured to be coupled to the head interface, an anchor having a portion secured to and within the pole segment, the anchor at a position proximal to the second end of the pole, a compression mechanism between the head interface and the anchor that biases the position of the rod in an outward direction away from the anchor, wherein the anchor is constructed and arranged to limit outward extension of the rod in the outward direction, and a stop that travels in relative motion with the rod in the direction along the longitudinal axis of the pole segment, wherein the stop interfaces with the anchor to limit the outward extension of the rod in the outward direction.

In some embodiments, when the compression mechanism biases the position of the rod in the outward direction, the locking plate moves relative to the pole segment.

In some embodiments, the rod is coupled to the head interface by a universal joint.

In some embodiments, the rod comprises a ball joint and the head interface comprises a socket.

In some embodiments, the head interface includes a clamp that is adapted for coupling the biasing unit to a head.

In some embodiments, the head includes a pad.

In some embodiments, the pad includes a non-skid material.

In some embodiments, the pad includes a compressible material.

In some embodiments, the pad is elongated.

In some embodiments, the pad provides a point of contact.

In some embodiments, the guide portion and locking plate comprise openings through which the biasing unit extends.

In some embodiments, the pole interface is offset from a longitudinal axis of extension of the biasing unit.

In some embodiments, the pole interface is open-ended.

In some embodiments, the pole interface is constructed and arranged to partially surround a pole without completely surrounding the pole.

In some embodiments, a distance between an end of the biasing unit and an end of the pole interface is adjustable.

BRIEF DESCRIPTION OF THE DRAWINGS

The foregoing and other features and advantages of the inventive concepts will be apparent from the more particular description of embodiments of the inventive concepts, as illustrated in the accompanying drawings in which like reference characters refer to the same parts throughout the different views. The drawings are not necessarily to scale, emphasis instead being placed upon illustrating the principles of the inventive concepts.

DETAILED DESCRIPTION OF EMBODIMENTS

Figure 1:
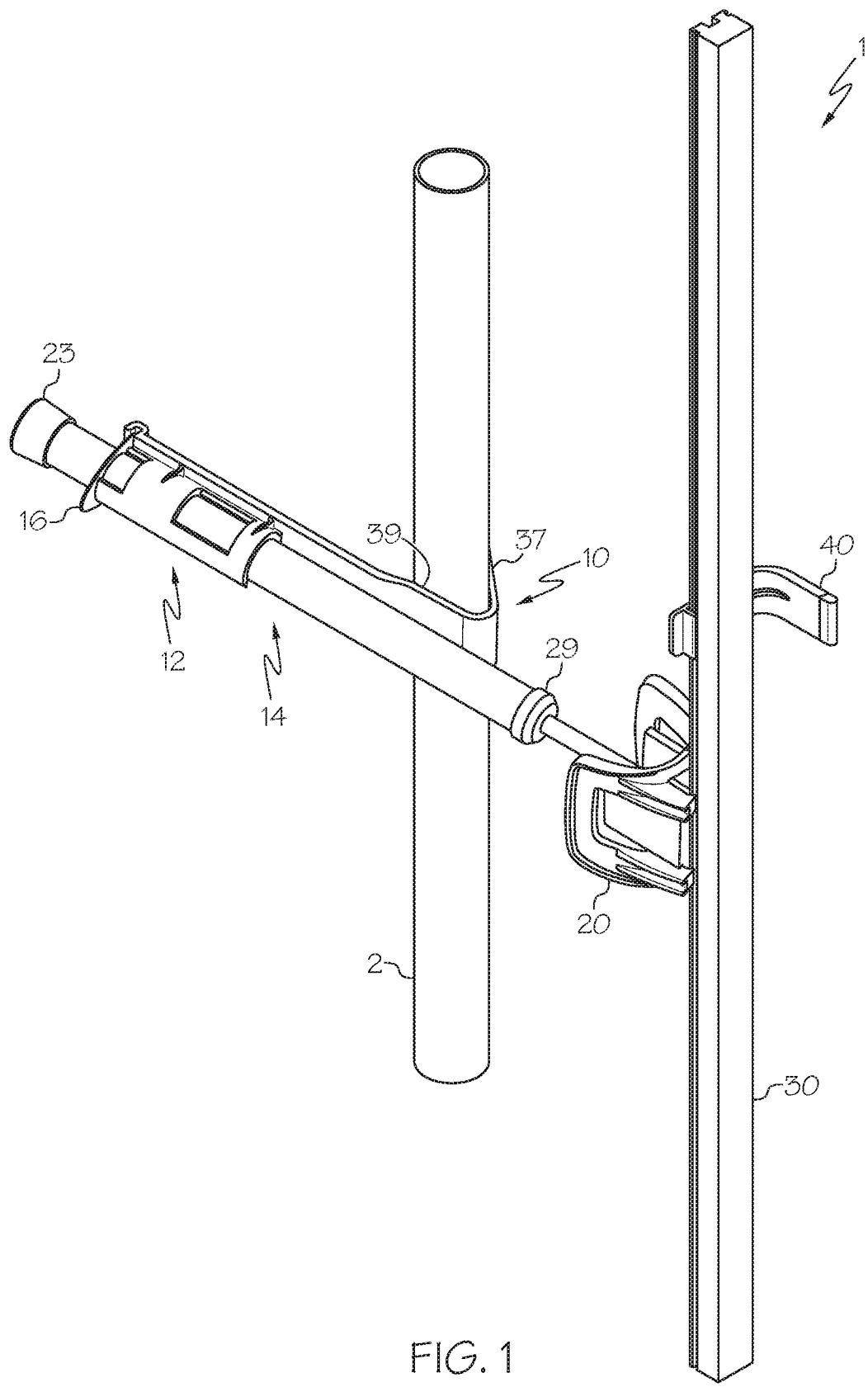
FIG. 1 is perspective view of a pole clamp system in accordance with embodiments of the present inventive concepts.

Various example embodiments will be described more fully hereinafter with reference to the accompanying drawings, in which some example embodiments are shown. The present inventive concepts may, however, be embodied in many different forms and should not be construed as limited to the example embodiments set forth herein.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present inventive concepts.

Spatially relative terms, such as "beneath," "below," "lower," "above," "upper" and the like, may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present inventive concepts. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in such shapes.

Figure 2A:
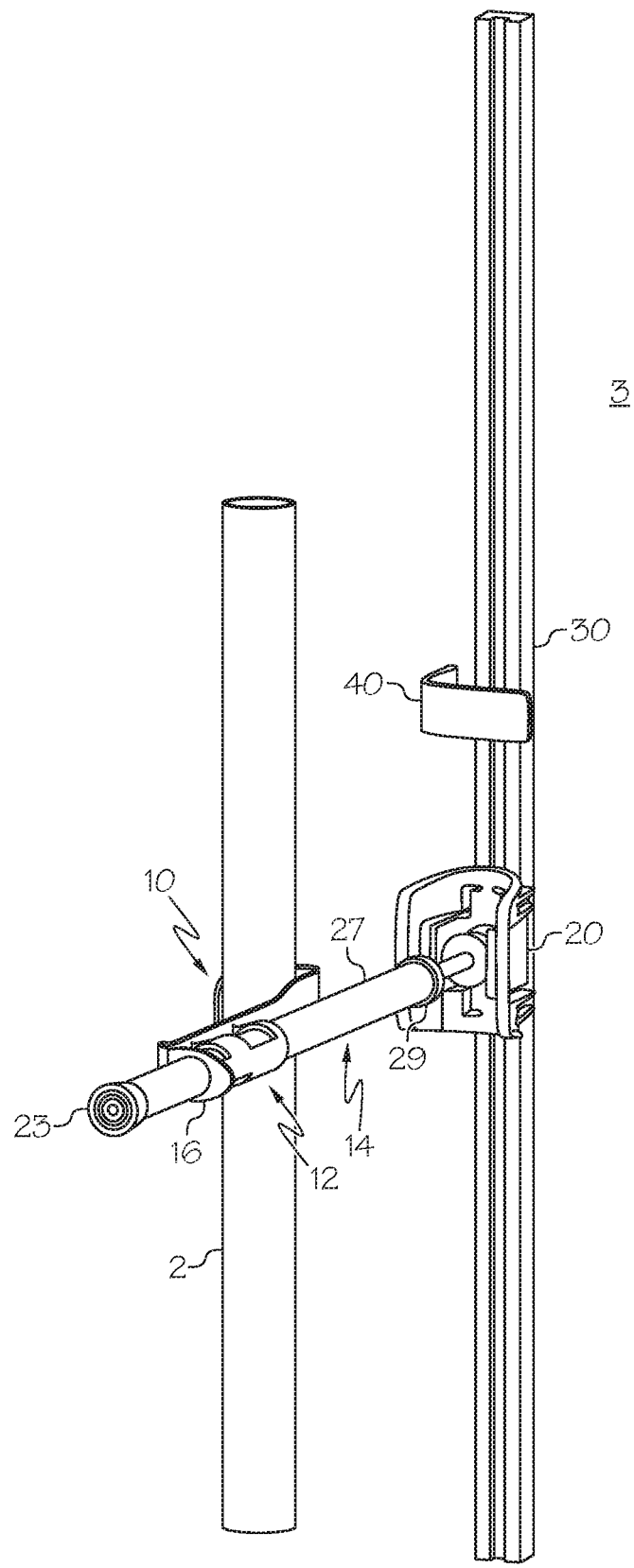
FIG. 2A is a perspective view of the pole clamp of FIG. 1 mounted between an extension pole and an abutting surface in accordance with embodiments of the present inventive concepts.
Figure 2B:
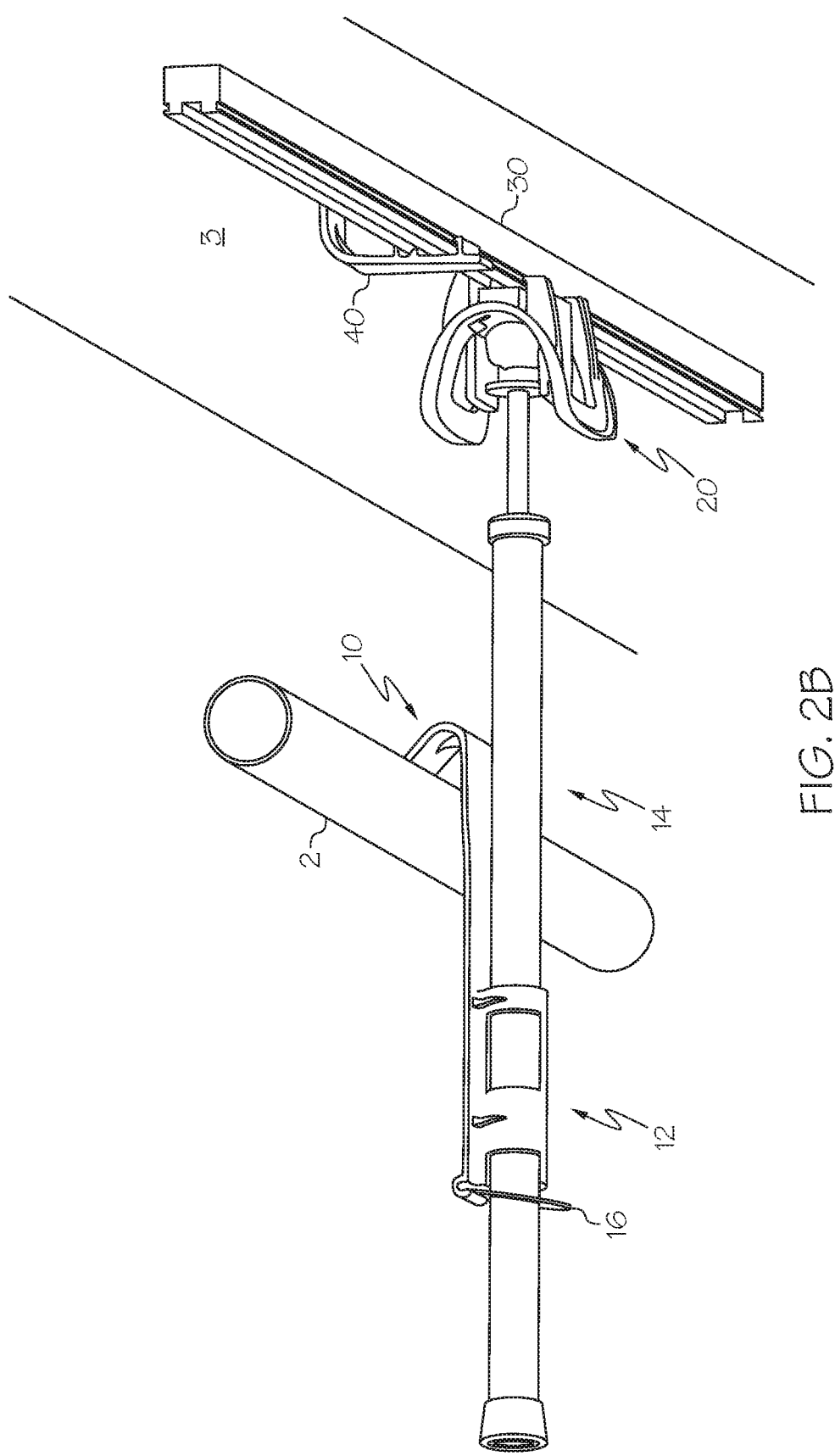
FIG. 2B is a perspective view of the pole clamp of FIG. 1 mounted between an extension pole and an abutting surface and illustrating a locking plate in a locked position in accordance with embodiments of the present inventive concepts.
Figure 3:
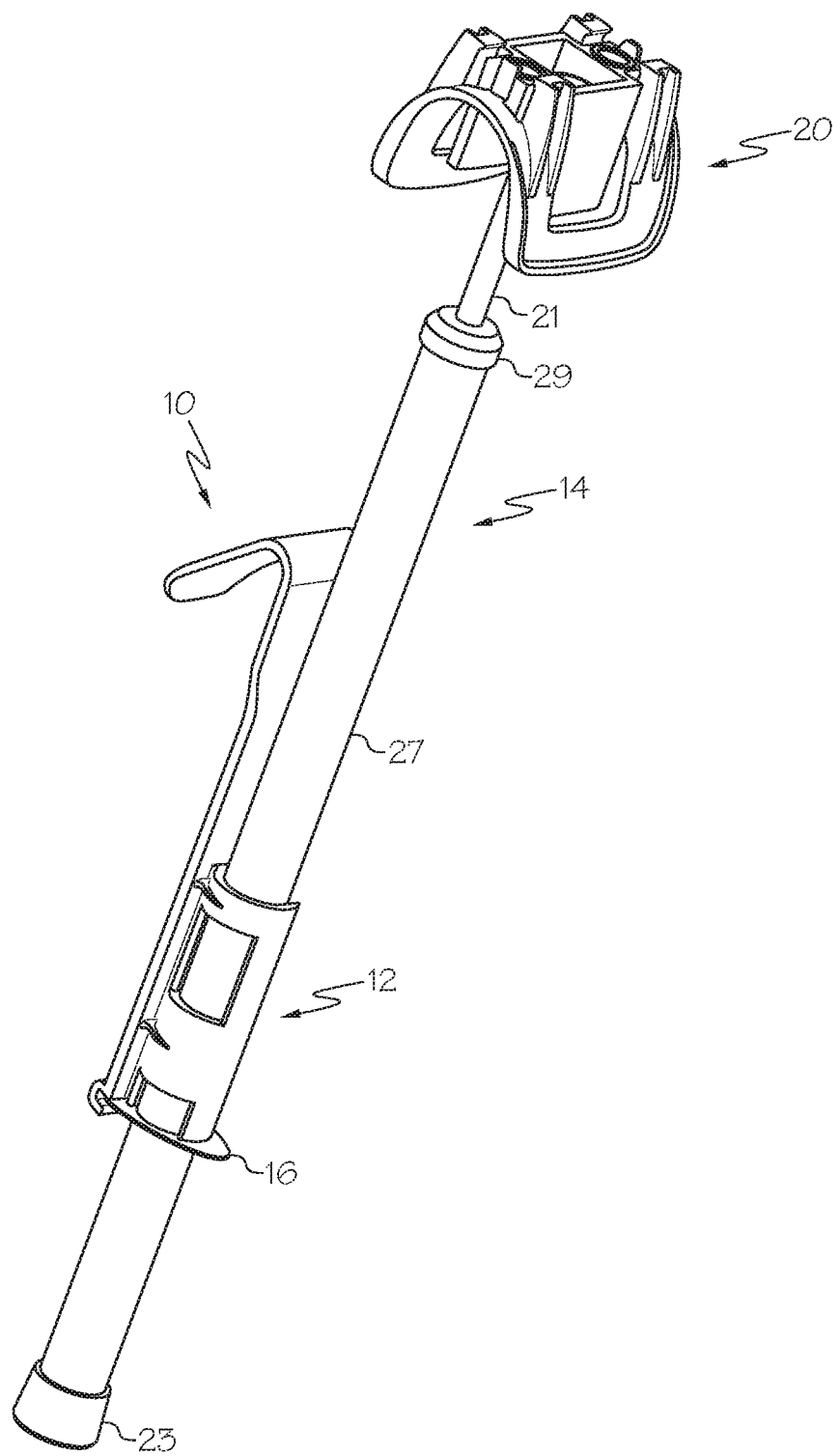
FIG. 3 is a perspective view of the pole clamp of FIG. 1 in accordance with embodiments of the present inventive concepts.

FIG. 1 is perspective view of a pole clamp system 1 in accordance with embodiments of the present inventive concepts. FIG. 2A is a perspective view of the pole clamp of FIG. 1 mounted between an extension pole 2 and an abutting surface in accordance with embodiments of the present inventive concepts. FIG. 2B is a perspective view of the pole clamp of FIG. 1 mounted between an extension pole and an abutting surface and illustrating a locking plate in a locked position in accordance with embodiments of the present inventive concepts. FIG. 3 is a perspective view of the pole clamp of FIG. 1 in accordance with embodiments of the present inventive concepts.

A pole clamp system 1 in connection with the present inventive concepts mitigates or eliminates sag, or gaps, that may otherwise be present between an installed curtain and an abutting surface such as a wall or ceiling. The system accomplishes this in a manner that avoids permanent damage to the wall or ceiling surface. In some embodiments, the pole clamp system 1 is mounted between an erected pole 2 and a nearby wall, window, or other surface. The pole clamp system 1 interfaces with a head 30 that urges the curtain against the wall over the length of the head 30, using the pole and wall for leverage. The head 30 may be, for example, an elongated foam rail which eliminates sag or gaps between the curtain and the abutting surface. In this manner, the effectiveness of the installation is increased, by reducing or eliminating gaps in the curtain along the wall.

In some embodiments, the pole clamp system 1 includes a pole interface or hook portion 10, a guide/handle portion 12, a locking mechanism or locking plate 16 and a biasing unit 14. The biasing unit 14 may be a compressible arm. The biasing unit portion 14 is coupled to the head 30. In some embodiments, the biasing unit 14 is linear in the sense that it produces an outward force in a longitudinal direction.

The pole clamp system 1 further includes a coupler 20. The coupler 20 is coupled to the head, or foam rail, 30. A stabilizer 40 stabilizes the foam rail 30 against the wall.

Figure 4A:
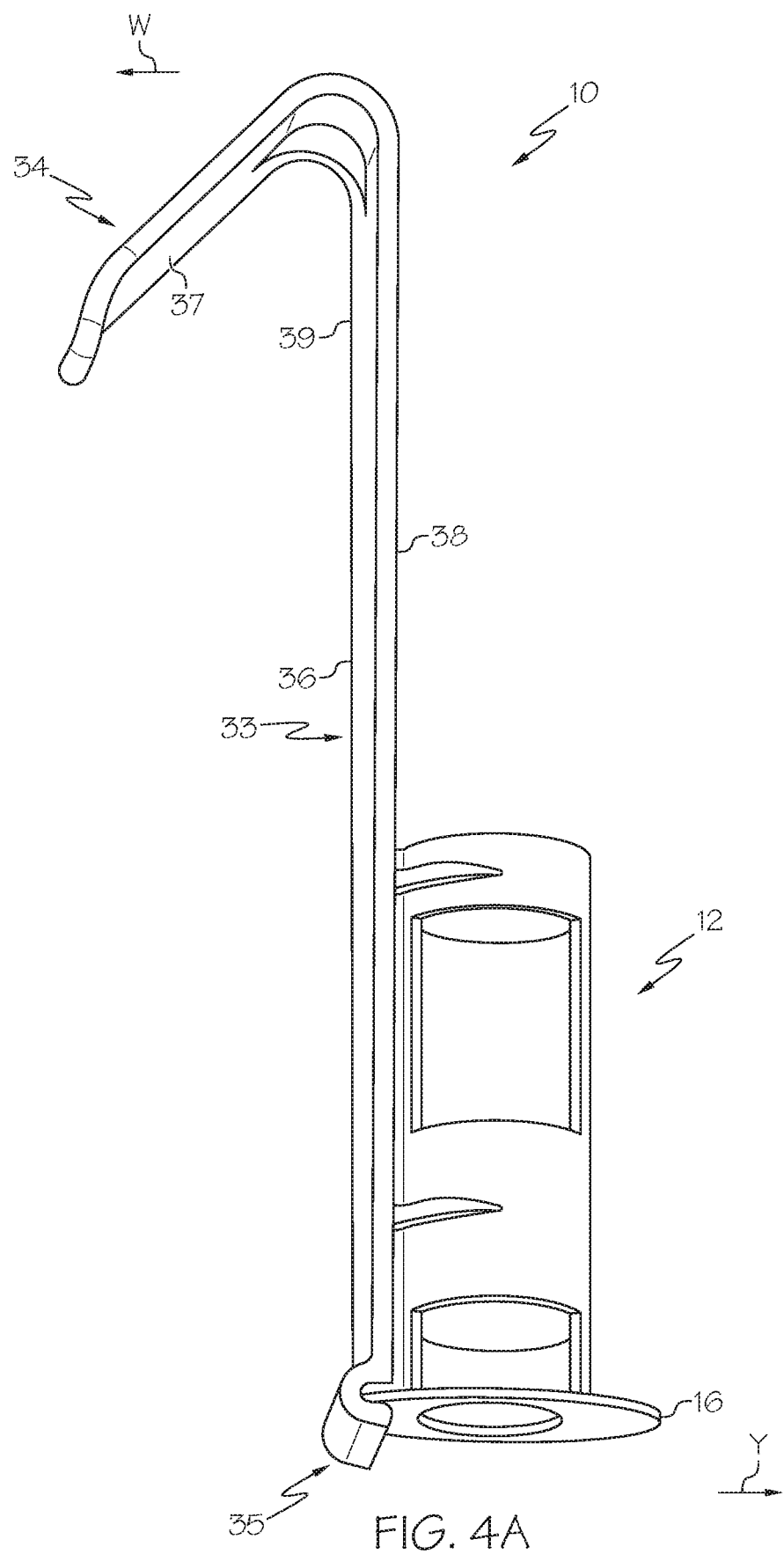
FIGS. 4A, 4B and 4C are perspective views of a hook portion, handle/guide portion and locking portion of the pole clamp of FIG. 1 in accordance with embodiments of the present inventive concepts.

The hook portion 10 is a pole interface adapted for interfacing with a side body portion of a pole. The hook portion 10 has an interface region for interfacing with a pole. The interface region is offset, that is, spaced apart from, a longitudinal axis, that is, an axis of extension, of the biasing unit 14. The hook portion 10 may include a hook at a first end which is angled and has two contact surfaces 37 and 39, as illustrated in FIGS. 1 and 4A, with a pole 2. The hook portion 10 is open-ended. That is, the hook portion 10 partially surrounds the pole 2 without completely surrounding the pole 2. The hook portion 10 is a pole capture which is offset, that is, spaced apart from, the biasing unit 14. A pole 2, for example, an extension pole as described in connection with U.S. Pat. Nos. 5,924,469 and 7,658,219, which are herein incorporated by reference, is positioned within the hook portion 10; however, the clamp 1 may be applied to various poles of various shapes and sizes.

The hook portion 10 is, for example, integral with the handle/guide portion 12. In some embodiments, the hook portion 10 and the handle/guide portion 12 may be formed using a straight-pull mold.

The hook portion 10 is offset from the linear, biasing unit 14. A distance between an end of the hook portion 10 and an end of the biasing unit 14 having a ball joint 11 is adjustable.

The locking plate 16 extends from a bottom portion of the hook portion 10 such that it extends adjacent to the handle/guide portion 12 in a direction opposite to the direction in which the hook of the hook portion 10 extends. That is, the hook of the hook portion 10 extends from a first surface 36 of the hook portion 10 and the handle/guide portion 12 and the locking plate 16 extend from a second surface 38 of the hook portion 10 which is opposite the first surface 36. The biasing unit 14 is positioned through the handle/guide portion 12 and locked in place by the locking plate 16, as will be described hereinafter.

The biasing unit 14 is a biasing unit for biasing the head interface, for example, the coupler 20 and foam rail 30, against the wall and for biasing the pole interface, for example, the hook portion 10, against the pole 2.

The biasing unit 14 includes a tube or pole 27 having a first end having a boot 23 and a second end having a cap 29. The boot 23 may comprise a non-skid material, for example, rubber. The biasing unit 14 further includes a rod 21 extending from the pole 27 through cap 29. The biasing unit 14 extends through holes in the locking plate 16 and the handle/guide portion 12. The rod 21 is slidable within the pole 27.

The locking plate 16 is between the boot 23 of the biasing unit 14 and the handle/guide portion 12. The locking plate 16 rotates relative to a curved portion 35 of the hook portion 10 and moves along pole 27 of the biasing unit 14. In some embodiments, the biasing unit 14 may have indexed positions along a longitudinal direction of the pole 27 of the biasing unit 14 for the locking plate 16 to move between.

In some embodiments, the coupler 20 is a head interface. The coupler 20 is a clamp that is adapted for coupling the pole clamp system 1 to a head or a foam rail 30. The head 30 may comprise, for example, at least one of a pad, a non-skid material or a compressible material. The head 30 is elongated and provides a point of contact. The coupler 20 is coupled to a universal joint, for example, universal joint 11 of FIG. 6, of rod 21 of the biasing unit 14. The coupler 20 may be coupled to a foam rail 30, as described in connection with U.S. Pat. No. 7,533,712, which is herein incorporated by reference. The foam rail 30 is biased against a wall by the pole clamp. The foam rail 30 may push a sheet of material against a wall 3. That is, a sheet of material may be positioned between the foam rail 30 and the wall 3 when the pole clamp system 1 is in a locked position. In some embodiments, the stabilizer 40 may clamp on to a groove of the foam rail 30 as a clip. The stabilizer 40 may be integral with the foam rail 30 or may be separate. The stabilizer 40 may have a protruding portion which may be inserted into a groove of the foam rail 30 and a clip portion which clips onto a side of the foam rail 30. The protruding portion of the stabilizer 40 may clamp around outer side portions of the foam rail 30. The stabilizer 40 has a foot portion that may interface with a wall. The foot portion of the stabilizer may comprise a non-skid material, for example, rubber, as illustrated in FIG. 1. In some embodiments, the pole clamp system 1 may include multiple stabalizers 40 and the stabalizers may be positioned on left and/or right sides of the foam rail 30.

In operating the pole clamp system 1, the pole 2 is erected, for example, between the floor and ceiling of a room. The hook portion 10 is placed around the pole 2. The biasing unit 14 may be slid through the openings in the locking plate 16 and the handle/guide portion 12. The biasing unit 14 may then be pushed against the wall. When the biasing unit 14 is pushed against the wall, a spring 13 within the biasing unit 14 operates to bias the rod 21 of the biasing unit 14 in an outward direction. As the spring 13 biases the rod 21 of the biasing unit 14 in the outward direction, the locking plate 16 is pushed back, for example, the locking plate flops back. When the locking plate 16 is pushed back, it is at an angle relative to the pole 27 of the biasing unit 14 and the locking plate 16 binds with the pole 27 of the biasing unit 14. That is, the locking plate 16 becomes locked into a position at an angle, as illustrated in FIG. 2B. The spring 13 biasing the biasing unit 14, and the locking plate 16 being in a locked position pulls the hook portion 10 against the pole 2. That is, pressure is applied to the end of the biasing unit 14 and pushing the biasing unit 14 forward and releasing the locking plate 16.

In order to release the pole clamp system 1 from the locked position, the locking plate 16 is pushed forward releasing the biasing unit 14 so that the biasing unit 14 becomes slidable and releases the pressure of the hook portion 10 against the pole 2.

An outward bias of spring 13 (see FIG. 6) serves to urge the foam rail 30 against the curtain and wall 3 and the hook portion 10 against the pole 2. The outward bias of the spring 13 is preferably sufficiently strong to hold the clamp 1 in place, but not so strong as to overcome the lateral rigidity of the pole 2.

The position of the locking plate 16 is adjusted due to the force of spring 13 placing the locking plate 16 in a locked position. When the locking plate 16 is in the locked position, the force of spring 13 pulls contact surfaces 37 and 39 of the hook portion 10 against the pole 2 and biases the rod 21 of the biasing unit 14 against the wall. The locking plate 16 and biasing unit 14 pull the hook portion 10 toward the pole 2 clamping the hook portion 10 around the pole 2, and, simultaneously, the spring 13 applies pressure to the rod 21 of the biasing unit 14, urging the rod 21 against the wall.

Figure 4B:
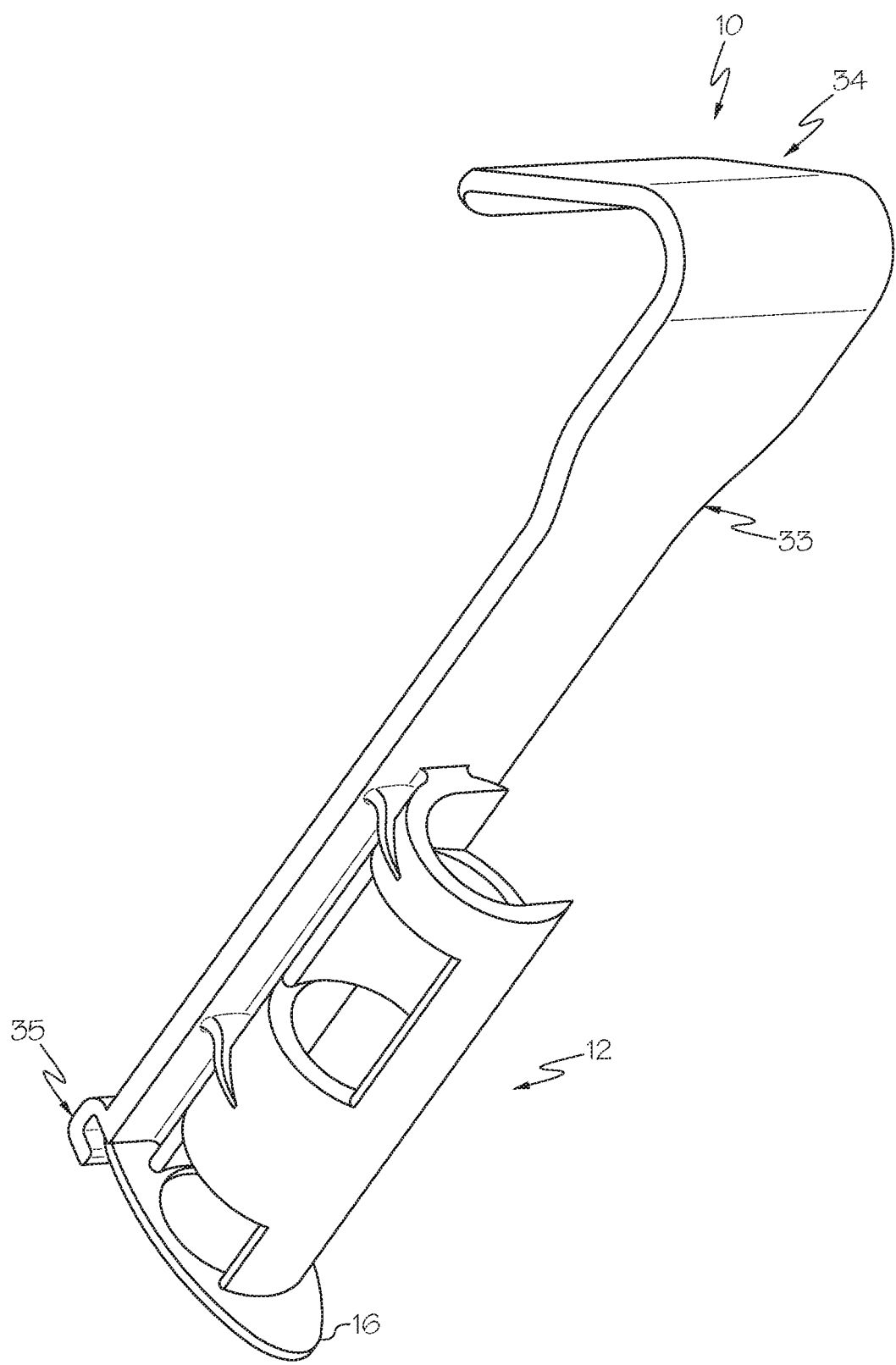
Figure 4C:
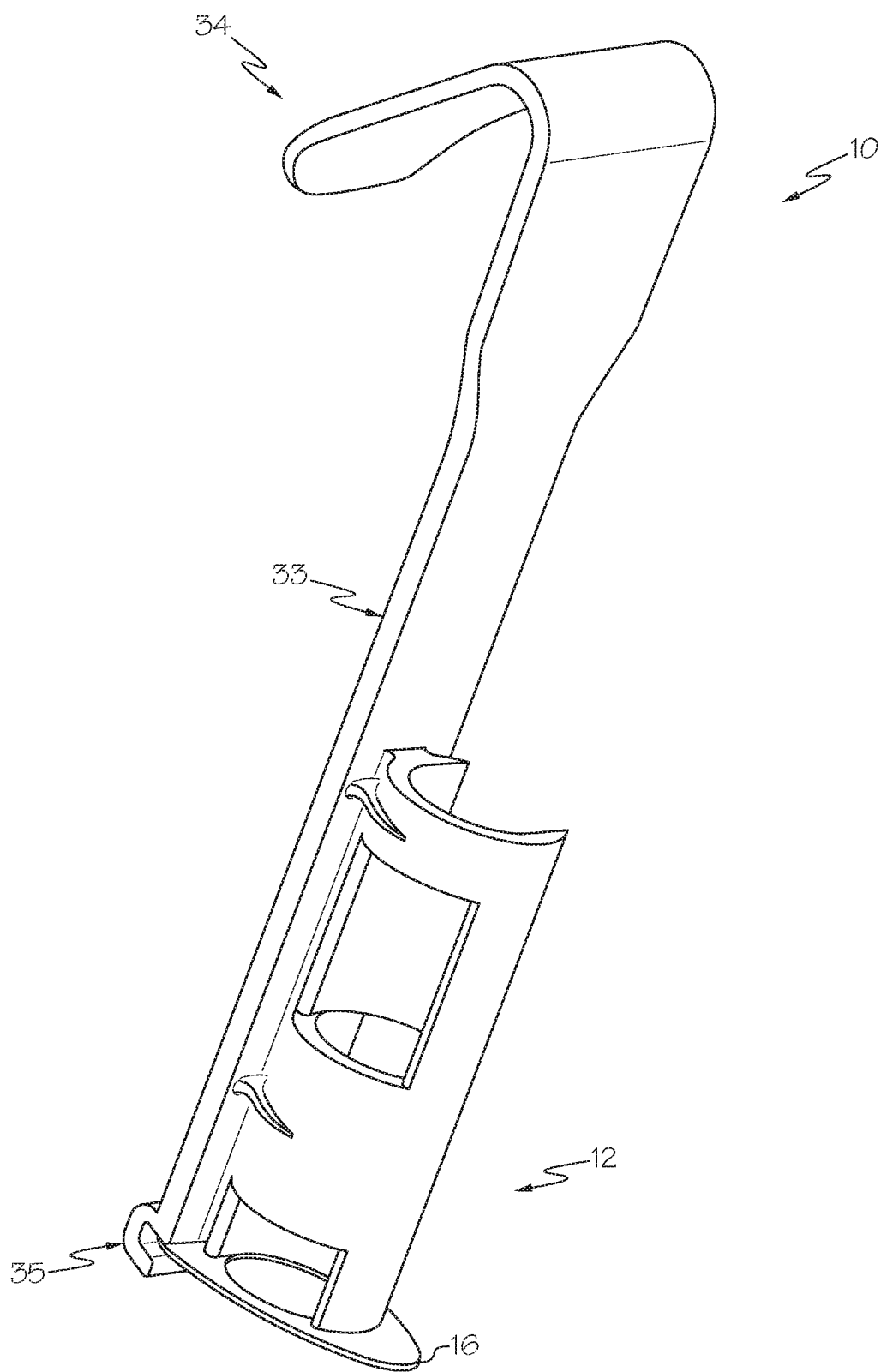

FIGS. 4A, 4B and 4C are perspective views of a hook portion 10, handle/guide portion 12 and locking portion 16 of the pole clamp 1 of FIG. 1 in accordance with embodiments of the present inventive concepts.

The hook portion 10 includes a first portion 33 and a second portion 34. The first portion 33 may be a base portion and the second portion 34 may be a hook. The first portion 33, or base portion, is offset from the biasing unit 14 and extends in parallel with the biasing unit 14. The first portion 33 has a first surface 36 and a second surface 38 opposite the first surface 36. The second portion 34 extends at an angle from a first end of the first portion 33 in a first direction W. The second portion 34 extends from the first surface 36. The handle/guide portion 12 extends from a second end of the first portion 33 in a second direction Y opposite the first direction W. The handle/guide portion 12 extends from the second surface 38. The hook portion 10 includes a curved portion 35 at the second end of the first portion 33. The locking plate 16 is coupled within the curved portion 35 extending from the curved portion 35 in the second direction Y from the second surface 38. The locking plate 16 is adjacent to the handle/guide portion 12. The locking plate 16 and the handle/guide portion 12 have openings or holes through which the biasing unit 14 may be inserted.

Figure 5:
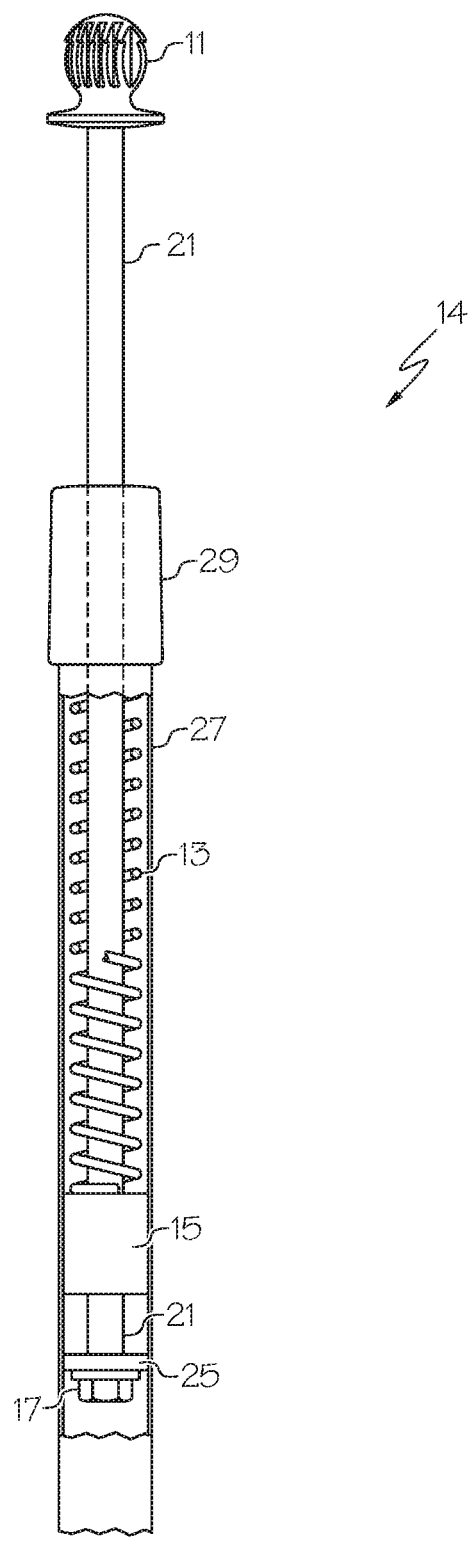
FIG. 5 is a sectional assembled side view of a compression mechanism of a portion of a biasing unit of the pole clamp of FIG. 1 in accordance with embodiments of the present inventive concepts.

FIG. 5 is a sectional assembled side view of the compression mechanism of a portion of the biasing unit 14 of the pole clamp of FIG. 1 in accordance with embodiments of the present inventive concepts.

Referring to FIG. 5, the rod 21, for example, including a universal joint ball 11, includes a longitudinally extending body that extends through a first end of a pole segment 27 and is retained by an anchor 15. A spring 13 is coupled between a cap 29 and the anchor 15 around an exterior of the rod 21. That is, the rod 21 passes through a longitudinal opening in the spring 13. The anchor 15 and cap 29 may have, for example, a circular outer profile, a square or rectangular outer profile; however, the present inventive concepts are not limited thereto. In some embodiments, the bottom portion of the ball joint 11 rests on top of, and comes in contact with, cap 29 before the spring 13 becomes fully compressed.

The rod 21 is outwardly biasable. Biasing of the rod 21 may be performed, for example, by a compression mechanism, or spring, 13 that resides in an interior portion of the pole segment 27. When the rod 21 is pressed in a longitudinal direction into the pole segment 27, the spring 13 operates to bias the rod 21 in an opposite, outward direction, causing the locking plate to move. As the locking plate 16 is pushed back it will bind with the pole segment 27 at an angle, thereby, locking the biasing unit 14 in place. In this manner, the pole segment 27 and rod 21, when compressed and mounted against the wall and locked in position by locking plate 16, are outwardly biased toward the wall, which secures the biasing unit 14 in place.

The rod 21 extends from the first end of the pole segment 27 and travels in a direction along the longitudinal axis of the pole segment 27 relative to the anchor 15 position within the pole segment 27. The rod 21 and anchor 15 operate to prevent the rod 21 from being released from the first end of the pole 27. A stop or retainer including washer 25 and nut 17 at an end of the rod 21 travels in relative motion with the rod 21 in the direction along the longitudinal axis of the pole segment 27. The stop or retainer, for example, the washer 25 and nut 17, interfaces with the anchor 15 to limit the outward extension of the rod 21 in the outward direction. The rod 21 glides freely through the cap 29.

The anchor 15 mounts within the pole segment 27 such that its position is fixed within the pole segment 27. In some embodiments, the anchor 15 is placed at an appropriate position within the pole segment 27, and near an upper end of the pole segment 27, and the outer surface of the pole segment 27 is dimpled, for example using a punch tool, such that the anchor 15 is pinched between the dimples and thereby secured in place within the pole segment 27. In some embodiments, the anchor 15 is retained and secured in place by dimpling the body of the pole segment 27 into the anchor 15. Alternatively, the anchor 15 may be mechanically riveted, chemically bonded, or otherwise mounted in place within the interior of the pole.

The rod 21 slides freely through the anchor 15 and includes the stop or retainer, for example, washer 25 and nut 17, at an end to prevent its full release from the anchor 15. The spring 13, supported at one end by the anchor 15, when under compression, exerts an outward biasing force on the rod 21, while at the same time, rod 21 using the washer 25 and nut 17 prevents release of the rod 21 from the pole segment 27.

When an inwardly directed force is exerted on the rod 21, the rod 21 is urged in a direction toward the anchor 15 within the pole segment 27 and the spring 13 is compressed between spring seats on the bodies of the anchor 15 and the cap 29. The rod 21 slides freely through the anchor 15 to allow for travel of the rod 21 within the pole segment 27. When the inward force is released, the compression of the spring 13 operates to exert an outwardly directed force on the rod 21, extending the body of rod 21 in a direction outwardly oriented relative to the pole segment 27. In some embodiments, a washer 25 and nut 17 or other physical feature of the rod 27 prevent the rod 21 from being released from the end of the pole segment 27, thus limiting the outward travel of the rod 21.

In some embodiments, in a first mode of operation, the pole system can be deployed such that the spring mechanism 13 is actively engaging the rod 21 and coupler 20. For example, the first mode of operation.

FIGS. 6A, 6B, 6C, 6D and 6E are perspective views of a coupler of the pole clamp of FIG. 1 in accordance with embodiments of the present inventive concepts.

An elongated head 30, or foam rail, attaches to the coupler 20. A pivot in the coupler 20 permits rotational movement of the head 30, relative to the biasing unit 14, for example, in a single degree of freedom of rotation, that is, for example, parallel to the longitudinal axis of the head 30. The coupler 20 allows for the pole clamp system 1 to be installed in a variety of configurations, for example in a configuration where the ceiling and floor are not parallel. In various embodiments, the coupler 20 may comprise a hinge, or preferably, a snap-fit ball-and-socket joint that is, for example, limited in rotational degrees of freedom to allow for pivoting between the elongated head 30 with respect to the biasing unit 14, and to limit lateral rotation. The coupler 20 may be located at any position along the longitudinal axis of the head 30, and may be in a fixed longitudinal position, or alternatively, in a variable longitudinal position that can be set by a user during installation.

The elongated head 30 comprises a rail body 41 generally having a U-shaped cross-section, the rail including a channel 32 that is shaped to receive an edge of a compressible pad, for example, in the form of a foam block 31. The rail may be formed, for example, of extruded aluminum, or may otherwise be molded or die cast, for example of plastic, PVC, graphite or other resilient material. The foam block 31 may be rectangular in shape and extends over the length of the head 30. The foam block 31 may be compressed and seated into the channel 32, or may otherwise be glued or bonded to the rail 41. A portion of the body of the foam block 31 extends from the outer edge of the rail 41, such that the foam compresses at installation to provide for lateral rigidity and conformance between the head, curtain and installation surface. The foam block 31 is preferably formed of a non-skid material to prevent slippage. The foam block 31 may be wider than the rail 41 to prevent slippage.

Figure 6A:
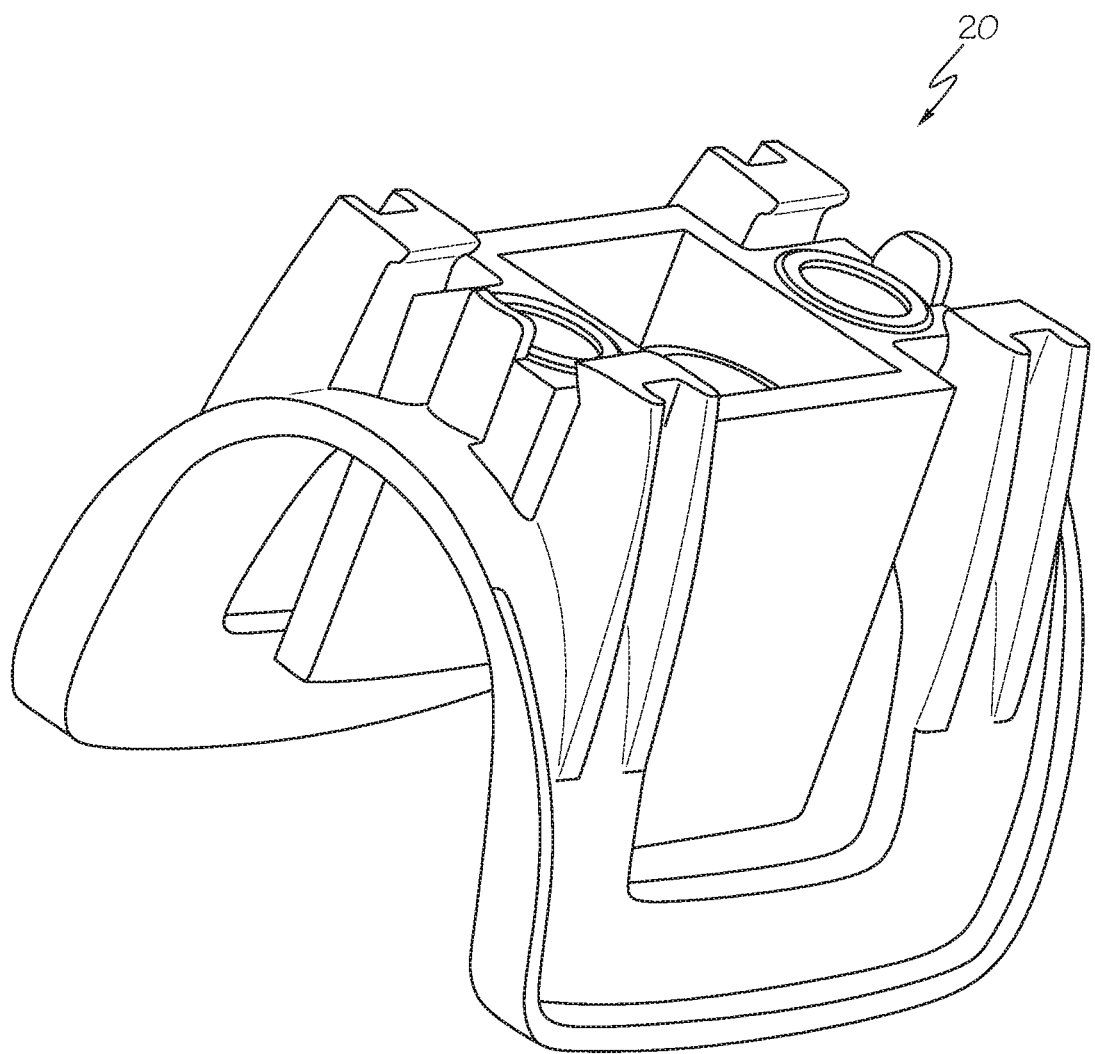
FIGS. 6A, 6B, 6C, 6D and 6E are perspective views of a coupler of the pole clamp of FIG. 1 in accordance with embodiments of the present inventive concepts.
Figure 6B:
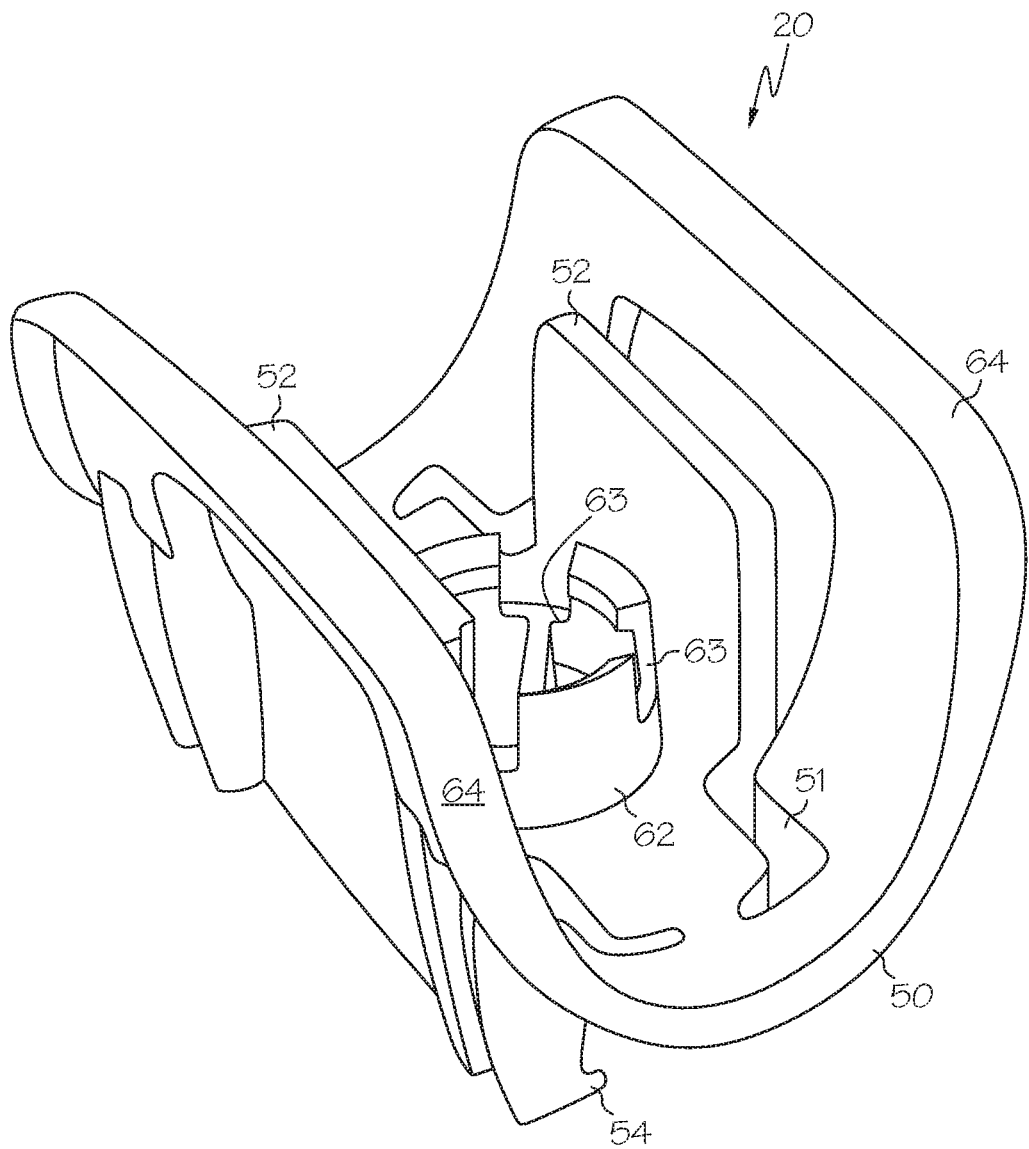

FIGS. 6A and 6B are close-up perspective views of a head coupler 20 in accordance with the present invention. In this view, it can be seen that a socket 62 includes voids, or slots 63, which allow for elastic expansion of the socket 62 about an inserted ball. In addition, the lower portion of a body 50 includes elasticity grooves 51, for improving the elasticity of the body 50 to allow for ease in deformation when mounting the body to a head. The geometry of neck retainers 52 is also visible in this view. The neck retainers 52 are preferably spaced apart a suitable distance so as to retain the rod 21 to prevent lateral rotation of the rod 21 about the head, or foam rail 30, and to permit free longitudinal rotation of the rod 21 about the head. Other geometries of the head coupler 20 and its various components and features are equally applicable to the present inventive concepts.

Figures 6C, 6E:
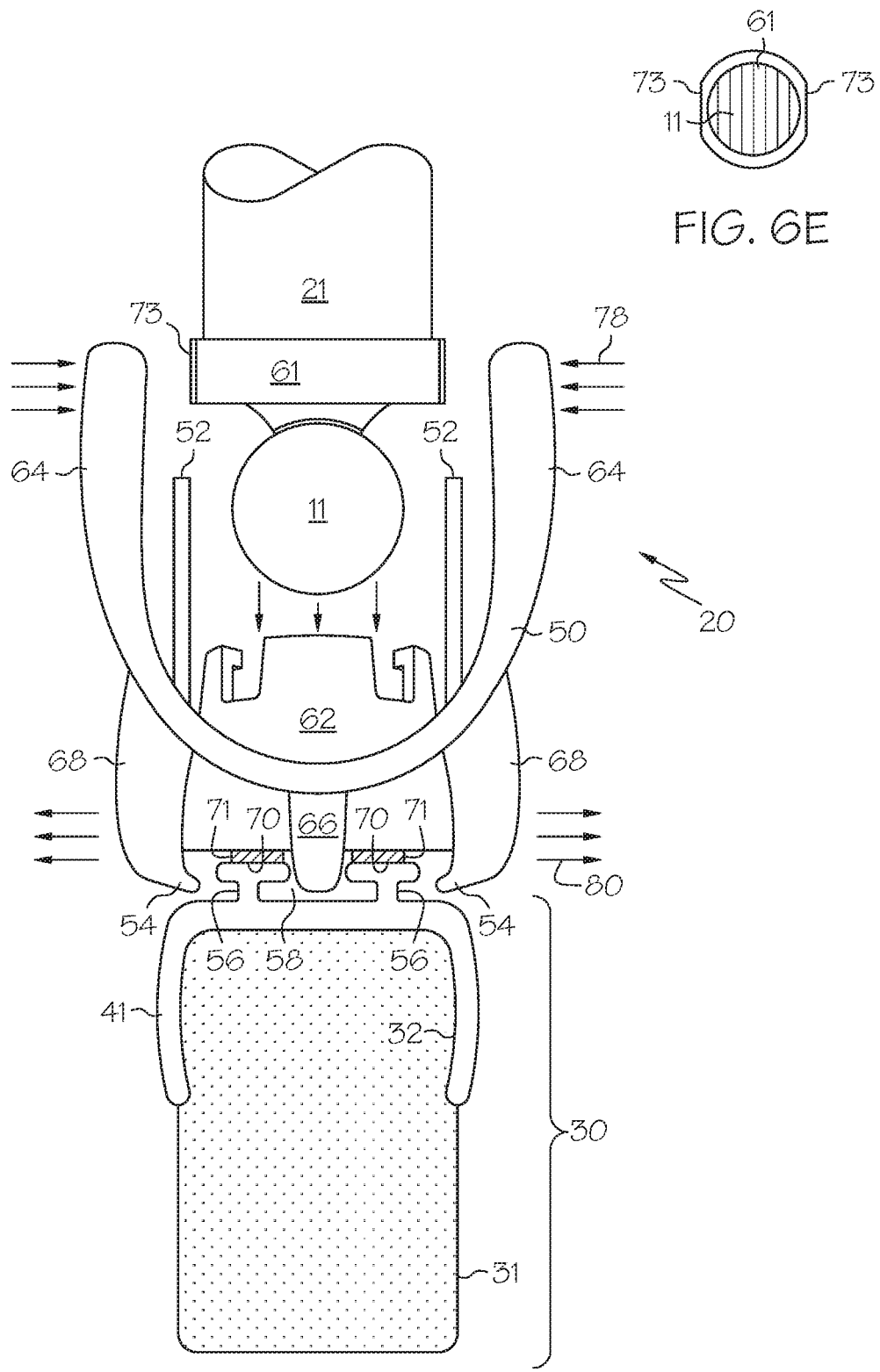
Figure 6D:
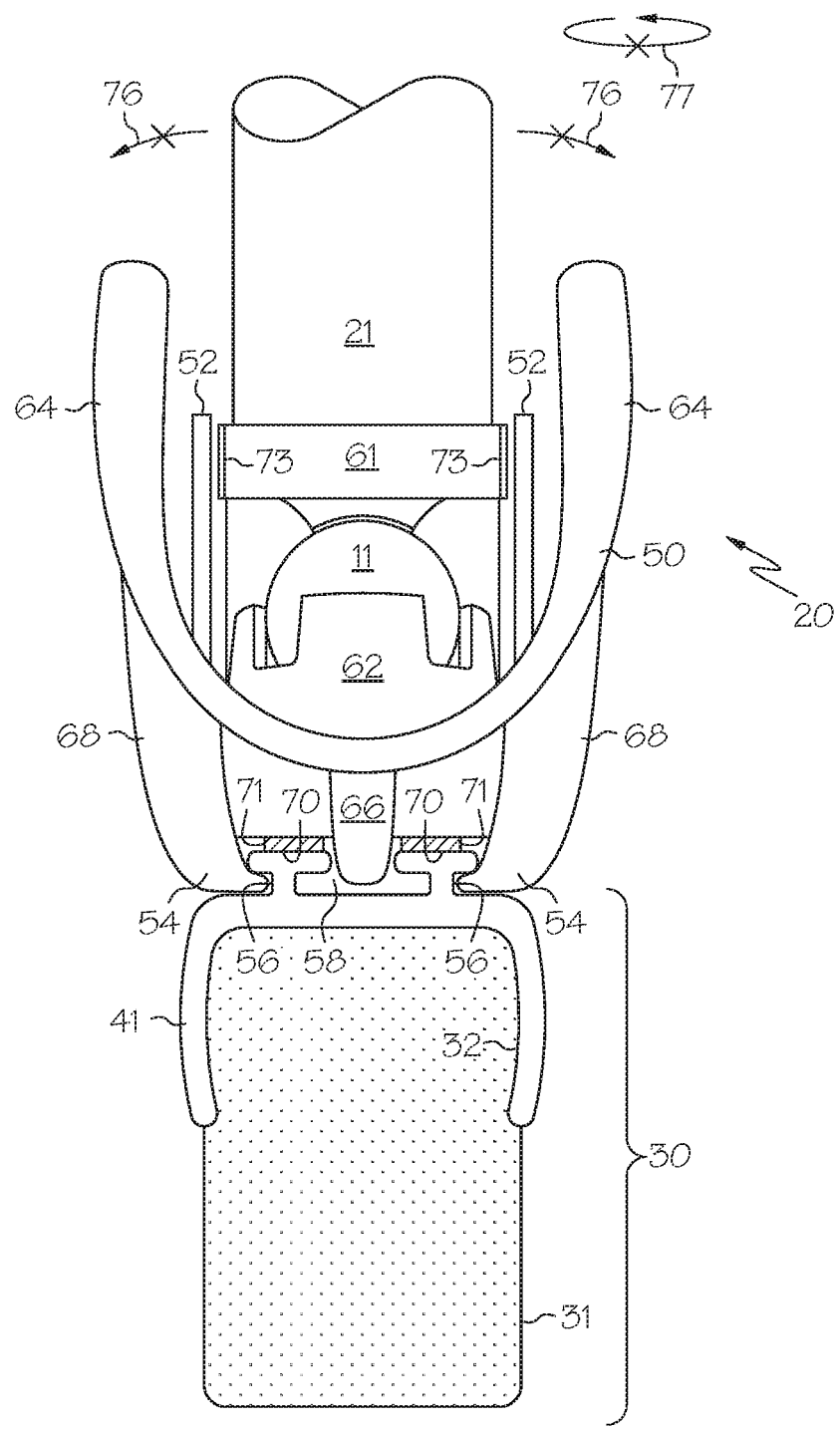

FIGS. 6C and 6D are side views of the coupler 20 being coupled to a head 30, or foam rail 30, in accordance with the present invention. The elongated head 30, or foam rail, comprises a rail body 41 generally having a U-shaped cross-section, the rail including a channel 32 that is shaped to receive an edge of a compressible pad, for example in the form of a foam block 31. In FIG. 6C, the rod 21 and the universal joint ball 11 of the jack assembly are pushed into the socket 62 of the coupler 20. With reference to FIG. 6D, once inserted, the ball 11 is press-fit into the socket 62, while neck retainers 52, extending from the body 50 prevent motion in the lateral direction, as indicated by arrows 76. In addition, with reference to the top view of the ball 11 and the rod 21 assembly of FIG. 6E, the rod 21 can be provided with a flange 61 having flat edge features 73 as shown. The flat edges 73 of the flange 61 are configured such that, when the ball is mounted into the socket, as shown in FIG. 6D, the flat edges 73 interface with the inner surfaces of the neck retainers 52, thereby preventing horizontal pivot of the head 30 assembly about the rod 21, as indicated by arrow 77. In this manner, greater control over the positioning of the head can be realized during mounting.

Returning to FIG. 6C, when inward pressure, as shown by arrows 78 is applied to the handles 64 of the coupler 20, the body 50 of the coupler flexes and the arms 68 move in an outward direction, as indicated by arrows 80. Outward movement of the arms 68 in turn causes the retention tabs 54 to deflect outwardly as shown, such that the tabs 54 can be positioned in the opposed horizontal grooves 56 of the rail 41. Coupler pin 66 is aligned with the central slot 58 of the rail 41 to serve as a mounting guide. In addition, the coupler pin 66 provides a point for leverage when mounting and removing the coupler 20, ensuring that when force is applied to the handles, both sets of tabs are released at the same time from the rail.

As shown in FIG. 6D, when the inward pressure 78 is released, the retention tabs 54 are fixed in the horizontal slots 56, and bear on an upper portion thereof. At the same time, the lower surface of the body of the coupler 20 bears down on an upper surface 70 of the body of the rail 41. Non-skid material, for example, in the form of rubber plugs 71 inserted into the lower surface of the coupler 20 body, further provide for a secure fit between the coupler 20 and rail 41, for example preventing slip of the coupler 20 in a longitudinal direction of the rail 41. The interaction of the retention tabs 54 and the lower surface of the coupler 20, along with the non-skid material 71, secures the coupler 20 to the head 30.

In one embodiment, the present inventive concepts further allows for positioning of the coupler 20 at a plurality of locations along the length of the rail 41 of the head 30. In the example given above, a suitable amount of inward pressure can be exerted on the handles 64 of the coupler 20 to cause the inward force of the retention tabs 54 to be released slightly. With the retention tabs 54 still interfacing with the rail groove 56, and with the pin 66 still interfacing with the central slot 58, when the retention tabs 54 are released slightly, the coupler 20 slides freely along the rail 41 of the head 30. In this manner, the coupler 20 can be positioned at any desired location along the rail 41. This feature further allows for a plurality of pole clamp systems to be mounted to a common head 30. In an alternative embodiment, the positioning of the interface of the coupler 20 and head 30 can be at fixed, indexed positions along the rail 41, for example, spaced apart by a fixed distance.

FIGS. 7A, 7B, 7C, 7D, 7E, 7F and 7G are views of a compression mechanism of a portion of a biasing unit of the pole clamp of FIG. 1 in accordance with embodiments of the present inventive concepts. FIGS. 7A-7G illustrate another embodiment of the biasing unit 14.

The biasing unit 14 may include a plunger assembly including an anchor 220, a spring 240, a retainer wire 260, and a plunger 280. The anchor 220 is generally cylindrical in shape and is formed of a pliable, or malleable yet resilient, material. The anchor 220 mounts within the inner pole segment 27 such that its position is fixed within the pole segment 27. In one example, the anchor 220 is placed at an appropriate position within the pole segment 27, and near an upper end of the pole segment 27, and the outer surface of the pole pole segment 27 is dimpled 560 (see FIG. 7A) for example using a punch tool, such that the anchor 220 is pinched between the dimples 560 and thereby secured in place within the pole segment 27.

The retainer wire 260 slides freely through the anchor 220 and includes a stop or retainer, for example, an elbow 360, at a first end to prevent its full release from the anchor 220. A second end of the retainer wire 260 includes a hook 340 that mates with a corresponding hole 400 formed in a flange 380 of the plunger 280. The spring 240 is seated between the anchor 220 and the plunger 280 about the retainer wire 260. In one embodiment, the retainer wire 260 is shorter in length than the spring 240. In this manner, the spring 240, supported at a first end by anchor 220, when under compression, exerts an outward biasing force on the plunger 280, while at the same time, the retainer wire 260 prevents release of the plunger 280 from the pole segment 27.

Figure 7A:
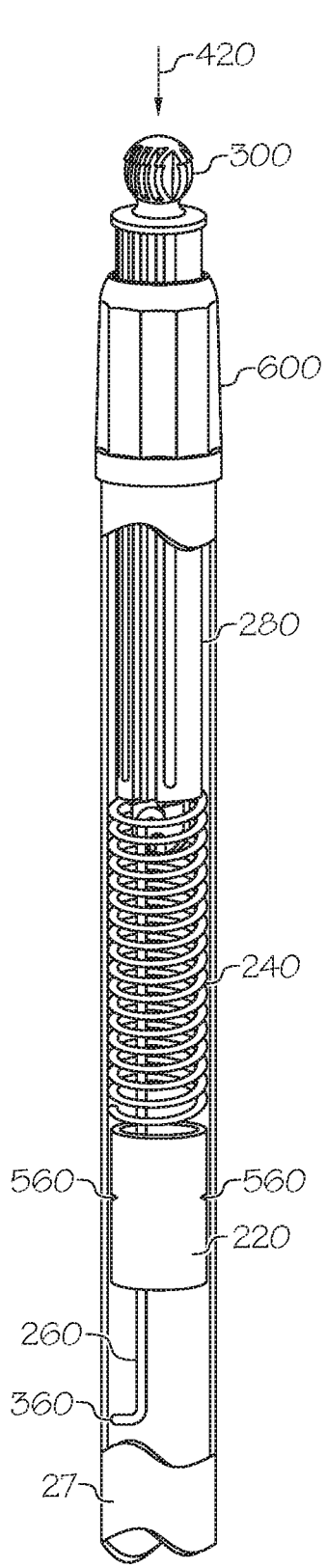
FIGS. 7A, 7B, 7C, 7D, 7E, 7F and 7G are views of a compression mechanism of a portion of a biasing unit of the pole clamp of FIG. 1 in accordance with embodiments of the present inventive concepts.
Figure 7B:
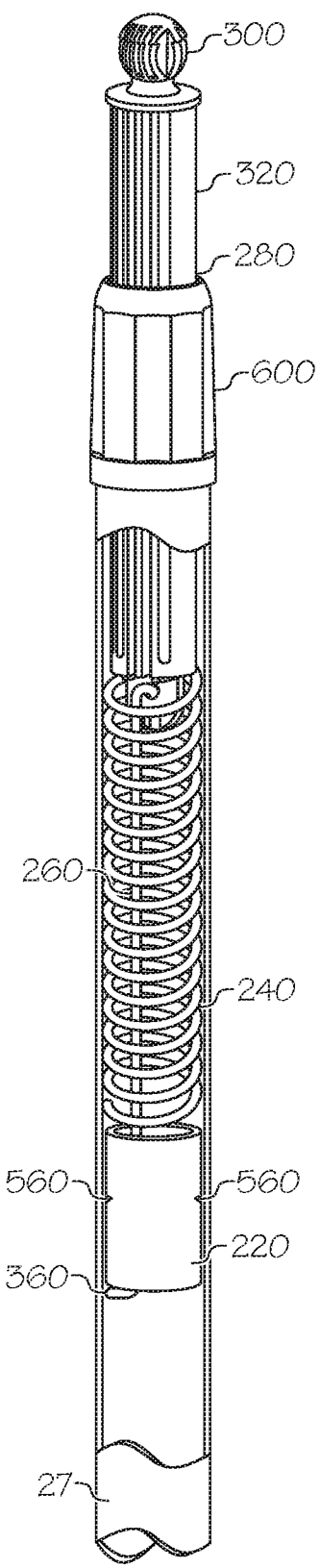

With reference to FIG. 7A, when an inwardly directed force 420 is exerted on the plunger 280, the plunger 280 is urged in a direction toward the anchor 220 within the pole segment 27 and the spring 240 is compressed between spring seats on the bodies of the anchor 220 and the plunger 280. The retainer wire 260 slides freely through the anchor 220 to allow for travel of the plunger 280 within the pole segment 27. Turning now to FIG. 7B, when the inward force 420 is released, the compression of the spring 240 operates to exert an outwardly directed force on the plunger 280, extending the body 320 of the plunger 280 in a direction outward of the pole segment 27. The elbow 360 in the first end of the retainer wire 260 prevents the plunger 280, retainer wire 260, and spring 240, from being released from the end of the pole segment 27, thus limiting the outward travel of the plunger 280.

In the embodiments shown, the anchor 220 is retained and secured in place by dimpling the body of the pole segment 27 into the anchor 220 at dimples 560. Alternatively, the anchor 220 may be mechanically riveted, chemically bonded, or otherwise mounted in place within the interior of the pole 280.

In one embodiment, the anchor 220 position relative to the upper end of the pole segment 27, as well as the length of the retainer wire 260, are selected such that when the plunger 280 is in a fully extended position relative to the anchor 220, the hook 340 of the retainer wire projects just beyond the upper end of the pole segment 27 so that the interface of the hook 340 and the hole 400 of the plunger 280 can be accessed only by first removing the collar 600. In this manner, inadvertent removal of the plunger 280 is prevented, while permitting service access should the need for component replacement arise.

Figure 7C:
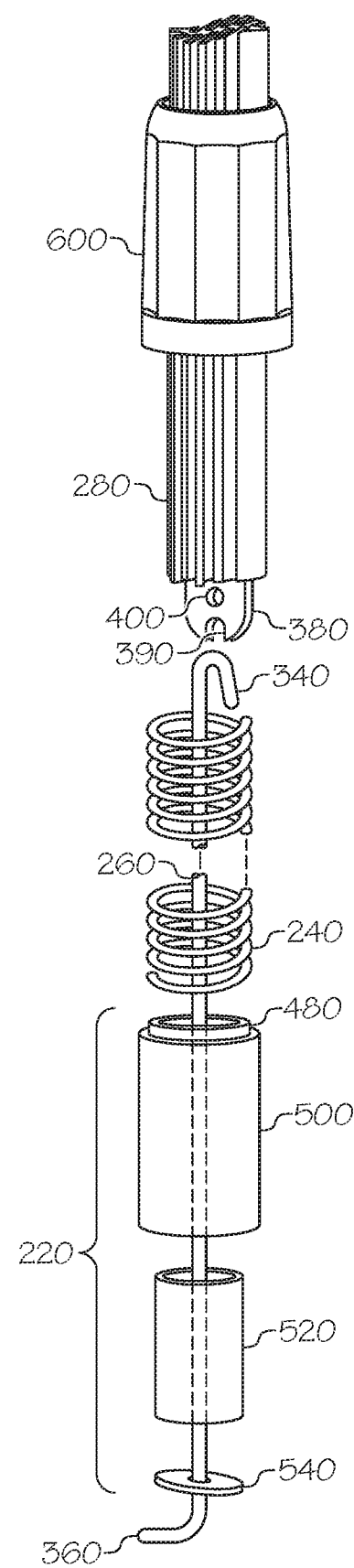

FIG. 7C is a close up view of the components of the integrated plunger assembly, in accordance with the present inventive concepts. The plunger 280 is formed of a lightweight, strong and durable material, for example of a molded Lexan™, or polycarbonate, material. The anchor 220, includes a cylindrical anchor body 500, a cylindrical dampener 520, and a washer 540. The anchor body 500 includes a neck 480 that provides a seat surface for an end of the spring 240. The anchor body 500 is formed, for example, of a molded ABS™ material. The outer diameter of the anchor body 500 is preferably slightly less than the inner diameter of the pole segment 27 in which it is to be mounted. The cylindrical dampener 520 is seated within the anchor body 500 and rests against an inner wall at the neck end of the inner body 500. The dampener 520 is formed of a shock-absorbent material, such as polyurethane, and is tubular in shape so as to provide for an appropriate degree of longitudinal compression. The washer 540 snaps into a seat at a tail end of the anchor body 500 and secures the dampener 520 in place within the body 500.

Returning to FIG. 7B, when inward force operating on the plunger 280 is released, an outward force is imparted on the plunger 280 by spring 240 until the elbow 360 of the retainer wire 260 abuts the washer 540 of the anchor 220. When this occurs, the anchor 220 is subject to a large amount of shock due to the impact of the acceleration of the spring operating on the elbow 360 of the retainer wire 260 that impacts the anchor 220. Returning to FIG. 7C, the dampener 520 of the anchor 220 operates to absorb the shock of the impact, which prevents excessive wear on the system components and lengthens component lifetime.

The plunger 280 includes a flange 380 that extends from a base of the plunger. The flange 380 includes a notch 390 and a hole 400. When the hook 340 of the retainer wire 260 is applied at a predetermined angle with respect to the flange 380, the end of the hook 340 can be mated with hole 400, while the body of the retainer wire 260 in the vicinity of the hook 340 rests within the notch 390 to allow the end of the hook 340 to reach the hole 400. Upon mating the hook 340 and the hole 400, the spring 240 can be seated about the flange 380. The spring is preferably of an inner diameter that is greater than the width of the flange 380, and is of an outer diameter that is less than the diameter of the plunger body 320, so that the flange 380 provides a suitable seat for the spring 240. Once mounted, spring 240 exerts an outward force between the anchor 220 and the plunger 280, while at the same time, the retainer wire 260 prevents the plunger 280 from being released from the anchor 220. The spring 240 is thus compressed between the plunger 280 and anchor 220, and the plunger 280 is thereby biasable in an outward direction relative to the pole segment 27.

When the plunger 280 is pressed in a longitudinal direction into the pole segment 27, the spring 240 operates to bias the plunger 280 in an opposite, outward direction, causing the locking plate 16 to move. As the locking plate 16 is pushed back, it will bind with the pole segment 27 at an angle, thereby, locking the biasing unit 14 in place. In this manner, the pole segment 27 and plunger 280, when compressed and mounted against the wall and locked in position by locking plate 16, are outwardly biased toward the wall, which secures the biasing unit 14 in place.

Figure 7D:
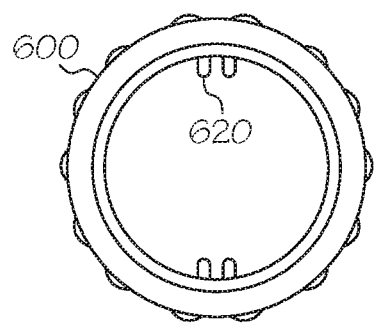
Figure 7E:
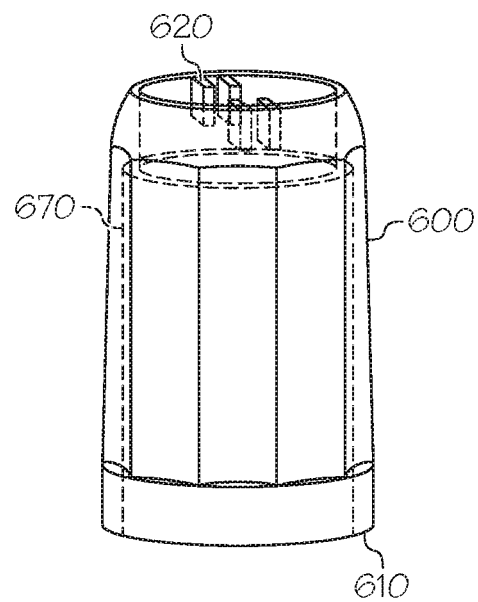

FIGS. 7D and 7E are top and side views respectively of collar 600. The collar 600 includes an inner seat 610 that is press-fit onto the end of the pole segment 27. A stop 670 prevents the pole end 440 from sliding through the entire collar 600. The collar 600 further includes inner guides 620 that mate with races 720 (see FIGS. 7F and 7G) that extend in a longitudinal direction along the body of the plunger 280. The mating guides 620 of the collar 600 and races 720 of the plunger 280 prevent rotation of the plunger 280 relative to the pole segment 27 to which the plunger is mounted.

Figure 7F:
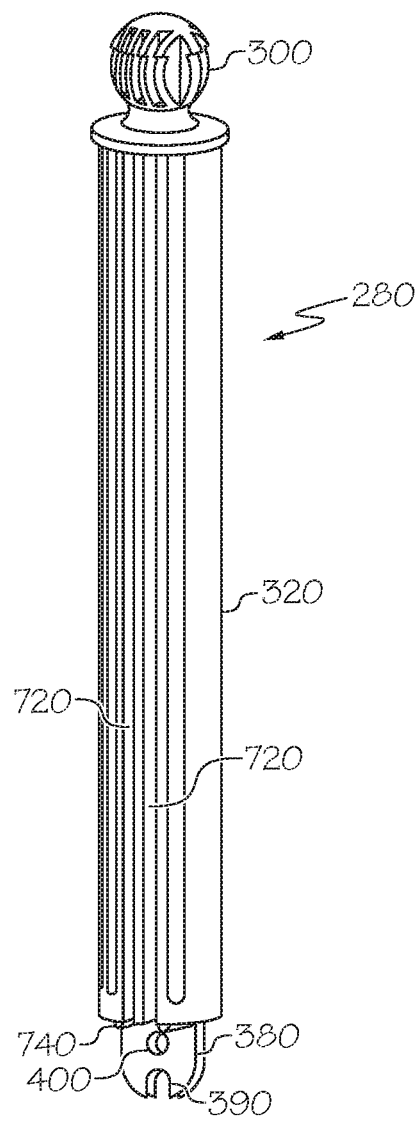
Figure 7G:
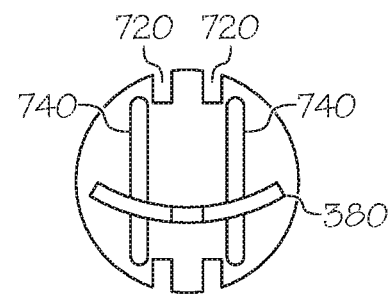

FIGS. 7F and 7G are side and bottom views respectively of the plunger 280. The plunger 280 includes a longitudinally extended body 320 having a universal joint ball 300 at a first end and a flange 380 at a second end. Races 720 are formed along the plunger body 320 for mating with the guides 620 in the collar 600 as described above. The interaction of the races 720 and guides 620 prevents rotation of the plunger 280 relative to the pole segment 27 to which the plunger 280 is mounted. The body of the flange 380 has a curved profile, to allow the retainer wire 260 to align with a central axis of the plunger body 320 when mounted to allow for smooth travel. Raised features 740 formed in an underside of the plunger body 320 provide a seat for the spring 240 and add strength to the flange 380.

The universal joint ball 300 is adapted to mate with the foam rail 30 for mounting a curtain. Other interfaces, including threaded interfaces, press-fit interfaces, hinged interfaces, and integrated head interfaces, are equally applicable to the present invention.

Figure 8A:
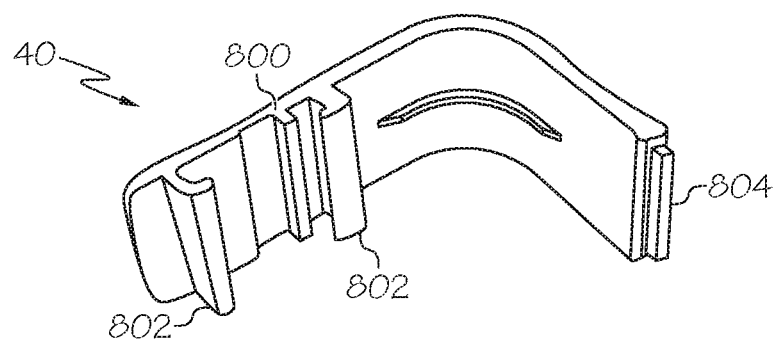
FIGS. 8A-C are perspective views of a stabilizer of FIG. 1 in accordance with embodiments of the present inventive concepts.
Figure 8B:
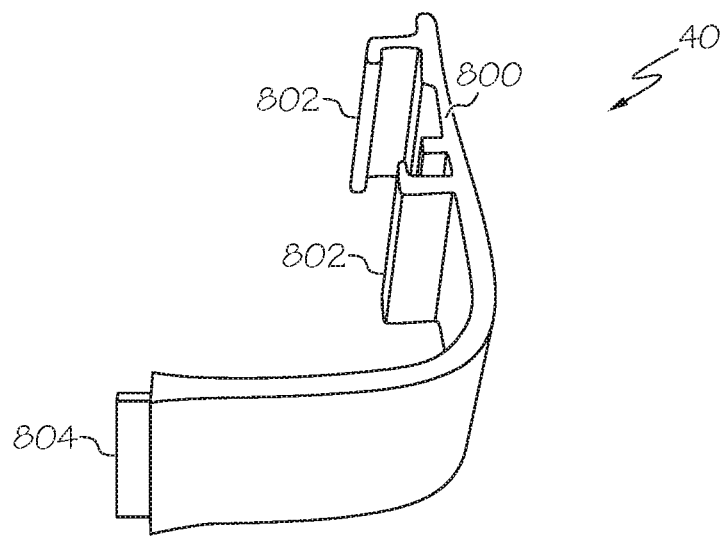
Figure 8C:
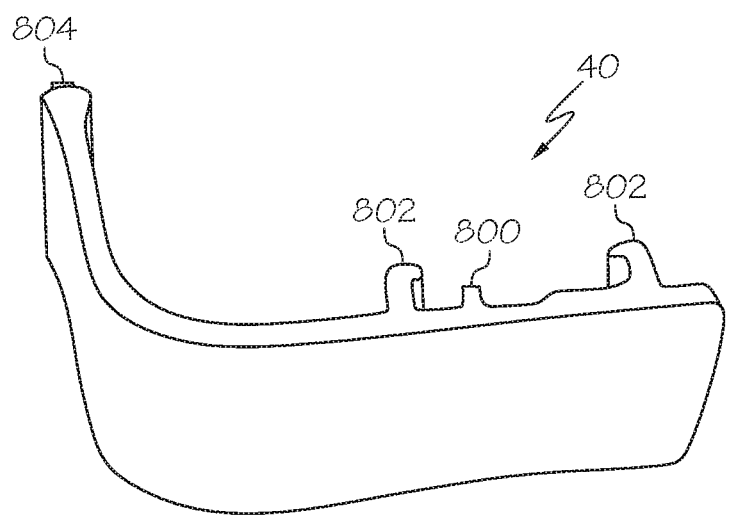

FIGS. 8A-8C is a perspective view of a stabilizer 40 of FIG. 1 in accordance with embodiments of the present inventive concepts. The stabilizer 40 may clamp on to a groove of the foam rail 30 as a clip. The stabilizer 40 may be integral with the foam rail 30 or may be separate. The stabilizer may have a protruding portion 800 which may be inserted into a groove of the foam rail 30 and a clip portion 802 which clips onto a side of the foam rail 30. The clip portion 802 protruding portion includes first and second protruding portions which may clamp around outer side portions of the foam rail 30. The stabilizer 40 may have a foot portion 804 that may interface with a wall. The foot portion 804 of the stabilizer may comprise a non-skid material, for example, rubber, as illustrated in FIG. 1. The pole clamp system 1 may include multiple stabilizers and the stabilizers may be positioned on left and/or right sides of the foam rail 30.

While the present inventive concepts have been particularly shown and described above with reference to example embodiments thereof, it will be understood by those of ordinary skill in the art, that various changes in form and detail can be made without departing from the spirit and scope of the present inventive concepts described and defined by the following claims.

What is claimed is:

1. A pole clamp system for mounting between a pole and an abutting surface comprising:
   a pole interface;
   a guide portion extending from the pole interface;
   a locking plate extending from the pole interface adjacent to the guide portion;
   a biasing unit extending through the guide portion and the locking plate; and
   a head interface coupled to the biasing unit;
   wherein the biasing unit outwardly biases the pole interface and head interface in opposite directions, and
   wherein the locking plate moves along the biasing unit.

2. The pole clamp system of claim 1, wherein the locking plate rotates relative to the pole interface.

3. The pole clamp system of claim 1, wherein the pole interface comprises a base portion and a hook extending in a first direction at an angle from the base portion.

4. The pole clamp system of claim 3, wherein the base portion is offset from the biasing unit and extends in parallel to the biasing unit.

5. The pole clamp system of claim 3, wherein the hook comprises two points of contact for interfacing with a pole.

6. The pole clamp system of claim 3, wherein the guide portion and the locking plate extend from the base portion in a second direction opposite to the first direction.

7. The pole clamp system of claim 1, wherein the biasing unit is linear.

8. The pole clamp system of claim 1, and wherein the biasing unit comprises:
   a pole segment having a first end and a second end, the pole segment being adjustable in length between the first end and the second end, the pole segment having a longitudinal axis;
   a rod that extends into the second end of the pole segment and configured to be coupled to the head interface;
   an anchor having a portion secured to and within the pole segment, the anchor at a position proximal to the second end of the pole;
   a compression mechanism between the head interface and the anchor that biases the position of the rod in an outward direction away from the anchor, wherein the anchor is constructed and arranged to limit outward extension of the rod in the outward direction; and
   a stop that travels in relative motion with the rod in a direction along the longitudinal axis of the pole segment, wherein the stop interfaces with the anchor to limit the outward extension of the rod in the outward direction.

9. The pole clamp system of claim 8, wherein, when the compression mechanism biases the position of the rod in the outward direction, the locking plate moves relative to the pole segment.

10. The pole clamp system of claim 8, wherein the rod is coupled to the head interface by a universal joint.

11. The pole clamp system of claim 10, wherein the rod comprises a ball joint and the head interface comprises a socket.

12. The pole clamp system of claim 1 wherein the head interface comprises a clamp that is adapted for coupling the biasing unit to a head.

13. The pole clamp system of claim 1, wherein the pole interface is offset from a longitudinal axis of extension of the biasing unit.

14. The pole clamp system of claim 1, wherein the pole interface is open-ended.

15. The pole clamp system of claim 1, wherein the pole interface is constructed and arranged to partially surround a pole without completely surrounding the pole.

16. The pole clamp system of claim 1, wherein a distance between an end of the biasing unit and an end of the pole interface is adjustable.

17. A pole clamp system for mounting between a pole and an abutting surface comprising:
   a pole interface comprising a hook having two points of contact for interfacing with a pole;
   a guide portion extending from the pole interface;
   a locking plate extending from the pole interface adjacent to the guide portion;
   a biasing unit extending through the guide portion and the locking plate; and
   a head interface coupled to the biasing unit;
   wherein the biasing unit outwardly biases the pole interface and head interface in opposite directions, and
   wherein the pole interface further comprises a base portion, wherein the hook extends in a first direction at an angle from the base portion, wherein the base portion is offset from the biasing unit and extends in parallel to the biasing unit.

18. The pole clamp system of claim 17, wherein the guide portion and the locking plate extend from the base portion in a second direction opposite to the first direction.

* * * * *